United States Patent [19]
Fayard et al.

[11] Patent Number: 5,156,414
[45] Date of Patent: Oct. 20, 1992

[54] SYSTEM FOR CONTROLLING THE GEOMETRY OF A VEHICLE WHEEL

[75] Inventors: Jean C. Fayard, Lyons; Charles Timoney, L'Etang la Ville, both of France

[73] Assignee: Elf France, Paris la Defense, France

[21] Appl. No.: 613,838

[22] PCT Filed: Apr. 5, 1990

[86] PCT No.: PCT/FR90/00238
  § 371 Date: Dec. 6, 1990
  § 102(e) Date: Dec. 6, 1990

[87] PCT Pub. No.: WO90/12273
  PCT Pub. Date: Oct. 18, 1990

[30] Foreign Application Priority Data
  Apr. 6, 1989 [FR] France .................. 89 04553

[51] Int. Cl.⁵ .................. G01B 5/24; B62D 17/00
[52] U.S. Cl. .................. 280/661; 384/255
[58] Field of Search .......... 280/661, 673, 690, 691; 384/255; 403/4

[56] References Cited

U.S. PATENT DOCUMENTS

| | | | |
|---|---|---|---|
| 996,473 | 6/1911 | Estes | 384/255 |
| 2,154,569 | 4/1939 | Hicks | 280/661 |
| 2,835,521 | 5/1958 | White | 280/674 |
| 3,124,370 | 3/1964 | Traugott | 280/661 |
| 4,026,578 | 5/1977 | Mattson . | |
| 4,842,295 | 6/1989 | Hawkins | 280/661 |
| 4,973,076 | 1/1990 | Fayard | 280/661 |

FOREIGN PATENT DOCUMENTS 2535670 2/1977 Fed. Rep. of Germany .
3714689 11/1988 Fed. Rep. of Germany .

*Primary Examiner*—Karin L. Tyson
*Attorney, Agent, or Firm*—Bacon & Thomas

[57] ABSTRACT

Device for adjusting the geometry of a vehicle wheel (14) consisting of a hub-holder (40) designed to accommodate the wheel (14) during rotation, the hub-holder (40) being fixed to the vehicle by means of at least one suspension element (18, 38) which is free to pivot in relation to the vehicle. According to said invention, the suspension element (18, 38) is fixed to the vehicle by means of at least one eccentric (32) which can be rotated in order to vary the angle between the suspension element (18, 38) and the vehicle.

11 Claims, 3 Drawing Sheets

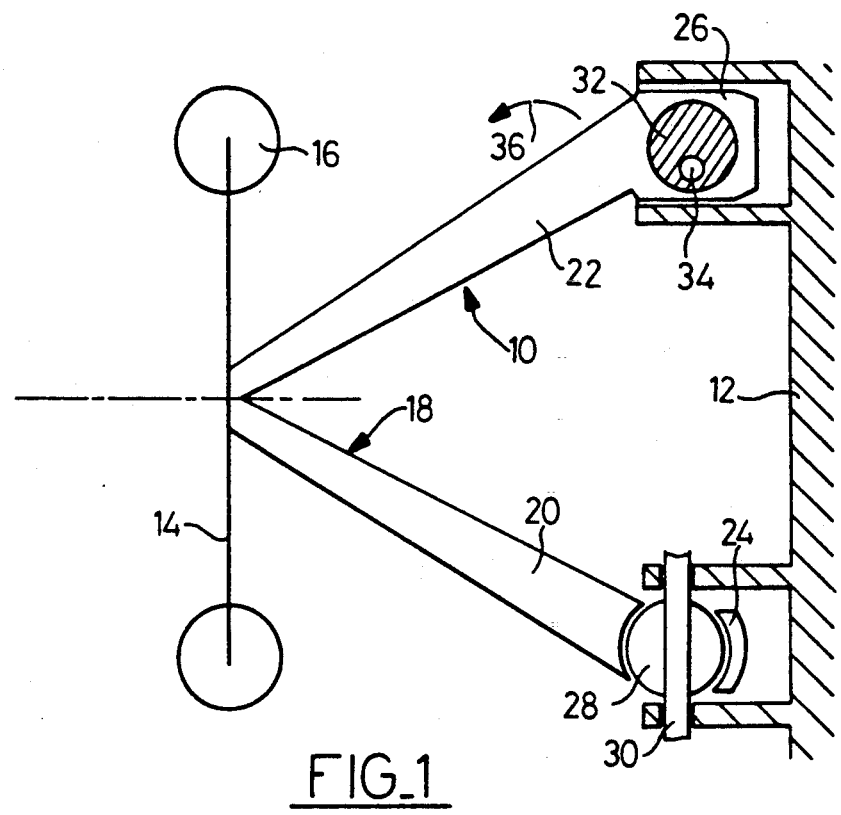
FIG_1
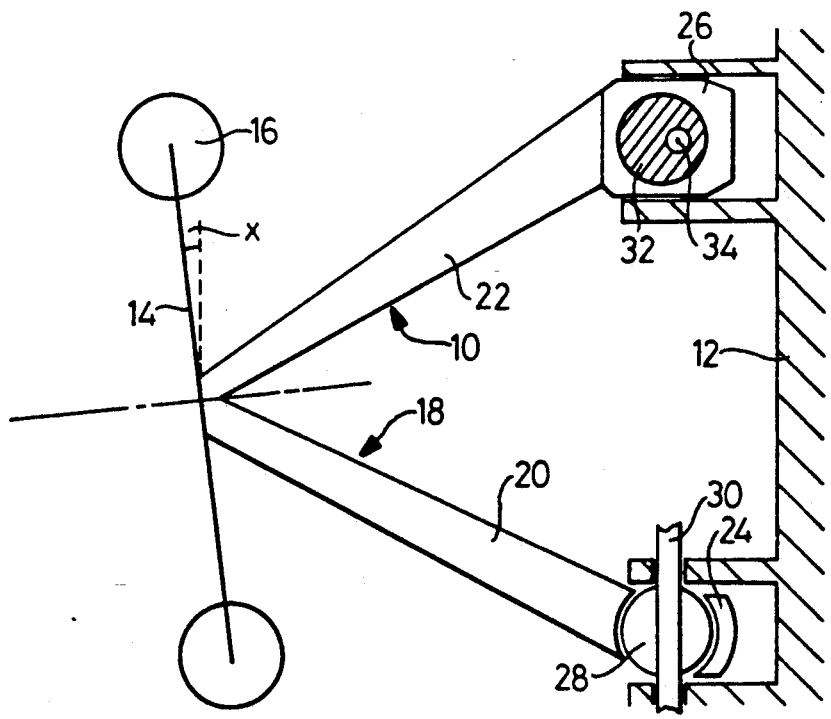
FIG_2

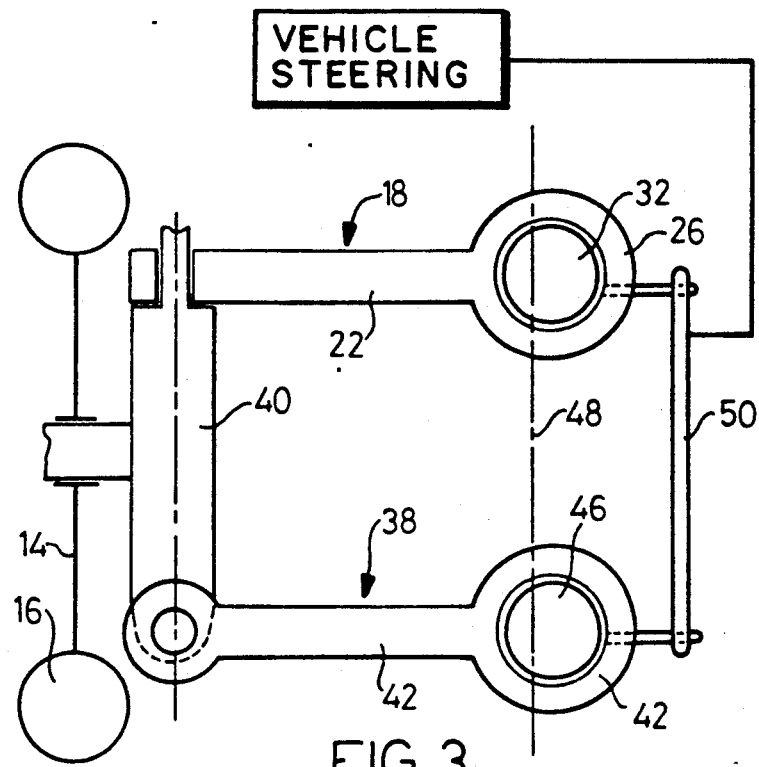
FIG_3
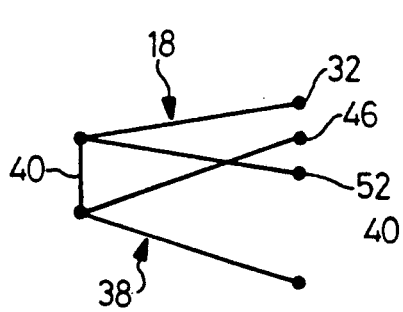
FIG_6A
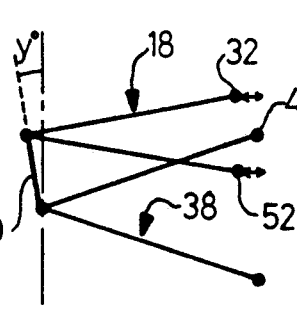
FIG_6B
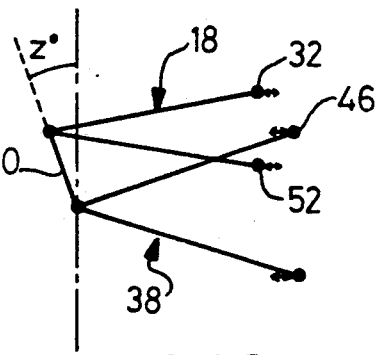
FIG_6C
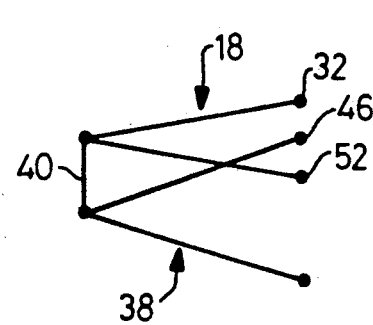
FIG_7A
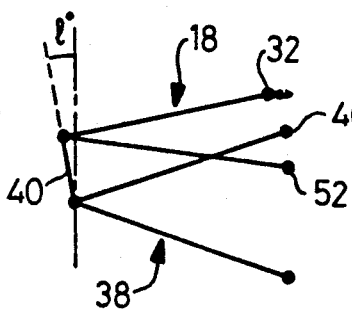
FIG_7B
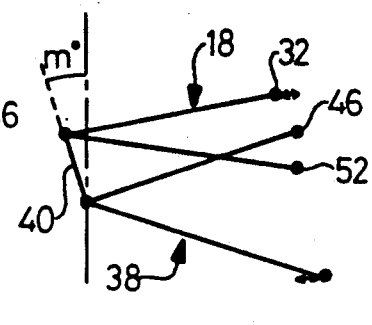
FIG_7C

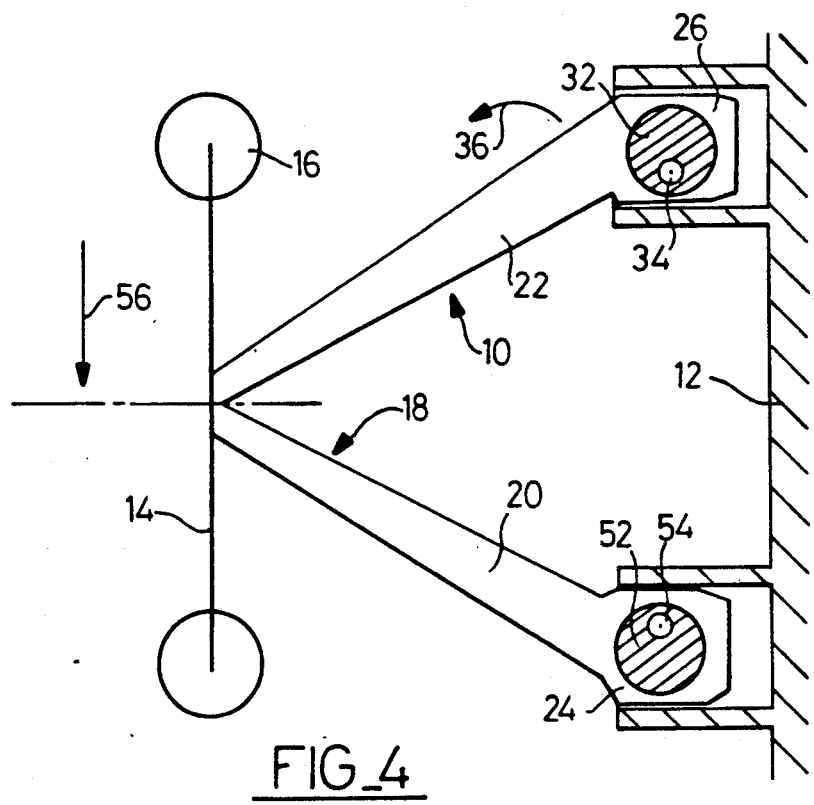
FIG_4
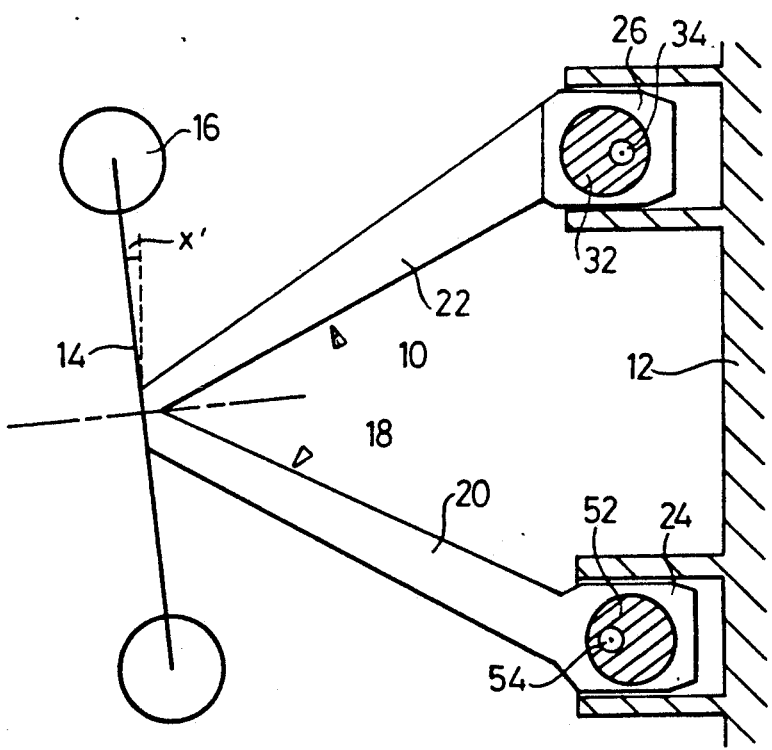
FIG_5

SYSTEM FOR CONTROLLING THE GEOMETRY OF A VEHICLE WHEEL

The present invention concerns a system controlling the geometry of a vehicle wheel.

As regards modern vehicles, be they mass-produced or racing cars, the vehicle-wheel geometry is an important factor of roadability and steering. The expression geometry covers the three main characteristics of a wheel suspended from a vehicle, namely turning radius, camber angle and caster angle.

Regarding the wheel camber angle, it will be either zero or very slight on most vehicles and is selected positive or negative. This camber angle is the acute angle subtended between a vertical and the median wheel plane. This angle is defined to be negative when the wheel axis is inside the vertical. Inversely it is positive when the wheel axis moves away from the vertical. The caster angle is the angle subtended by the pivot-axis of a wheel steering pin and the vertical. If the intersection of the pivot axis with the support plane is in front of the center of the contact surface of the tire, the caster is said to be positive. In the opposite case, there is negative caster. In the vehicles of the prior art, the best compromise is sought between the camber and the caster angles. This compromise must lead to minimizing such drawbacks as anomalous tire wear, vehicle instability, driving disagreeability or reaction forces on the steering wheel. As a rule therefore the camber angle is positive for private cars and negative for sports or racing cars.

The object of the present invention is to create a system controlling the geometry of a vehicle wheel, of simple design and increased reliability.

For that purpose the invention proposes a system controlling the geometry of a vehicle wheel comprising a hub-support which shall receive the rotating wheel and which is mounted on the vehicle by means of at least one suspension assembly component which can freely pivot with respect to the vehicle, this system being characterized in that to vary the wheel turning radius, the suspension component is mounted to the vehicle by means of a cam which can be rotated to change the angle subtended between the suspension component and the vehicle.

The invention further proposes a control system for the geometry of a vehicle wheel comprising a hub support mounted to the vehicle by means of two suspension components freely pivoting relative to the vehicle, said control system being characterized in that to vary at least two parameters of the geometry, either separately or in combination, each suspension component is mounted to the vehicle by means of a cam which can be rotated to vary the angle between each suspension component and the vehicle.

Other features and advantages of the present invention are elucidated below in the description and in relation to the attached drawing.

FIG. 1 is a diagrammatic view of the suspension assembly of a vehicle equipped with the system of the invention, FIG. 2 is a view similar to that of FIG. 1 however with a slight wheel steering angle, FIG. 3 is a diagrammatic view of the rear axle zone of a vehicle equipped with systems controlling the turning radius and the camber, FIGS. 4 and 5 are two diagrammatic views similar to FIGS. 1 and 2 but showing a system of the invention in a second embodiment mode, FIGS. 6A, 6B and 6C are diagrams of the suspension assembly showing the evolution of the camber angle through first and second angles y and z.

FIGS. 7A, 7B and 7C are diagrams of the suspension assembly showing the evolution of the caster angle through first and second angles l and m.

As shown by FIG. 1, the suspension assembly 10, which herein is the rear support assembly of a vehicle of which the frame 12 is partly shown, comprises a wheel 14 with a tire 16. The wheel 14 is mounted in rotating manner on a suspension triangle 18 by means of an omitted hub support. The suspension triangle 18 comprises two arms 20 and 22 of which the free ends 24 and 26 are mounted on the frame 12. The end 24 of the arm 20 is pivotably mounted on a swivel 28 itself mounted on a shaft 30 housed in the vehicle frame 12.

In the invention, the end 26 of the arm 22 is pivotably mounted by means of an eccentric cam or swivel 32 on the vehicle frame 12. In a preferred embodiment, the cam bearing comprises a cam swivel 32 which is affixed to a shaft 34 housed in the vehicle frame 12. When the plane of the wheel 14 is to be rotated, the shaft 34 is made to rotate, for instance counterclockwise (when looking at the drawing), so that the cam swivel also rotates. The eccentricity of the cam swivel 32 causes the displacement of the end 26 of the arm 22 which describes an arc as denoted by the arrow 36. After the shaft 34 and the cam swivel 32 have rotated by 90°, the suspension assembly 10 will be in the position shown in FIG. 2.

As shown by FIG. 2, the suspension triangle 18 has rotated on the swivel 28 and the plane of the wheel 14 subtends and an angle "x" with the plane of the wheel of FIG. 1.

According to the invention a vehicle's suspension assembly comprises two similar suspension triangles. FIG. 3 is essentially orthogonal to the plane of the FIG. 1 showing two suspension triangles 18 and 38 receiving at their ends the hub support 40. One end 26, 42 of an arm 22, 44 of each suspension triangle 18 and 38 comprises a cam swivel 32, 46. The two cam swivels 32, 46 are rotatably mounted about a common axis 48 and are connected by a schematically denoted drive means 50 which can drive them together in the same direction. Accordingly the drive means 50 causes a rotation of the plane of the wheel 14 in the manner shown in FIG. 2. The drive means 50 is mechanically linked to the vehicle steering.

The suspension assembly shown in FIGS. 1 through 3 only allows a turning radius "x" depending on the dimensions of the cam swivel 32. Moreover its operation requires some flexibility in each suspension triangle 18 and 38. The embodiment shown in FIGS. 4 and 5 allows a larger turning radius and rigid suspension triangles.

The embodiment of FIG. 4 differs from that of FIGS. 1 through 3 in that every end of each suspension triangle is mounted on the vehicle frame 12 by means of an associated cam swivel.

The end 26 or the arm 22 comprises a cam swivel 32 in the manner of the embodiment of FIG. 1. In similar manner, the end 24 of the arm 20 is received by a cam swivel 52 affixed to a shaft 54 which in turn is rotatably mounted on the vehicle frame. In the illustrated rest position, with the plane of the wheel 14 parallel to the direction of vehicle advance shown by arrow 56, each cam swivel 32 and 52 is mounted in similar manner. In this position, the centers of the cam swivels 32 and 52 and those of the shafts 34 and 54 are aligned.

When the plane of the wheel 14 is to be rotated, the two shafts 34 and 54 are made to rotate in inverse directions. Illustratively the shaft 34 is made to rotate counterclockwise (when looking at the drawing) and the shaft 54 rotates in the other direction. The eccentricity of the two cam swivels 32 and 52 causes the ends 24 and 26 of the arms 20 and 22 to move respectively to the right and left (when looking at the drawing). After the two shafts 34 and 54 both have moved through 90°, the suspension assembly 10 will be in the position shown by FIG. 5 wherein the plane of the wheel 14 subtends an angle x' with the plane of the wheel shown by FIG. 5. As both ends 24 and 26 of the arms 20 and 22 were moved, the angle x' equals twice the angle x. It is clear that the angle of rotation of the plane of the wheel 14 can be varied between 0° and the maximum angle x' shown by FIG. 5 merely by varying the angle of rotation of each of the shafts 34 and 54.

Obviously to rotate the plane of the wheel 14 in the other direction, it suffices to reverse the rotations of the shafts 34 and 54. Clearly in this embodiment mode, the other suspension triangle 38 is equipped with two swivels similar to those of the triangle 18. One swivel from each triangle is mounted in such a way as to rotate simultaneously with and in the same direction as the associated swivel of the other triangle so as to ensure changing the wheel turning radius.

The system shown by FIGS. 4 and 5 allows not only rotating the plane of the wheel 14 but also varying the camber angle and the caster angle of the wheel. In this case the swivels will be actuated separately.

Illustratively, if the camber angle must be changed, it suffices to rotate the shafts 34 and 54 of one suspension triangle, for instance the upper one 18, by the same angle and in the same direction. The two ends 24 and 26 of the triangle 18 move together in the same direction to the right or left when looking at the drawing, depending on the direction of rotation of the shafts 34 and 54, and the suspension triangle 10 moves laterally relative to the triangle 38 which remains stationary. This position is illustrated in FIG. 6B where the support-hub 40 was pivoted through an angle y° relative to its rest position shown by FIG. 6A. The camber angle of the wheel accordingly can be modified within the eccentricity limits of the cam swivels 32 and 52. If it is desired to modify the camber angle of the wheel 14 beyond these limits, it is enough to rotate together the two cam swivels of a suspension triangle in one direction while the two cam swivels of the other triangle are simultaneously rotated in the opposite direction. The variation of the camber angle therefore is twice that achieved by displacing a single suspension triangle. This position is illustrated in FIG. 6C where the variation in camber angle is z°.

In similar manner the present invention allows varying the caster angle of the wheel 14. The rest position of the suspension assembly 10 is shown in FIG. 7A. By rotating the shaft 34 of the cam swivel 32 while keeping the other three cam swivels motionless, a change l° is created in the caster angle. This position is illustrated in FIG. 7B. In some cases it will be desirable to change the caster angle beyond the limits shown by FIG. 7B: if so, it is enough to rotate the opposite cam swivel of the other suspension triangle in the opposite direction to double the change in caster angle. This position is illustrated in FIG. 7C where the caster angle variation is m°. Be it noted that the geometry of the suspension assembly is such that varying the caster angle entails a slight variation of the camber angle. Moreover it is clear that the caster angle can be varied in the opposite direction starting from the rest position by merely actuating the opposite cam swivel(s).

When the embodiment of FIG. 3 was described, the statement was made that the swivels were mechanically linked to the vehicle steering. However to assure improved control of the suspension-assembly geometry, each swivel may be advantageously driven by an associated electric motor and preferably each motor is a stepping-type motor.

In order to control all suspension parameters, i.e. the turning radius, camber and caster angles, either separately or in combination, eight similar stepping motors must be provided, one for each swivel, on the two rear wheels.

Each motor may be driven by a central electronics equipped with sensors illustratively to monitor the steering status, acceleration and vehicle roadability in order to select the optimal geometry of the vehicle's rear wheels. If it is only desired to control the wheel steering angle, four motors shall suffice, each connected to two analogous swivels of a suspension assembly.

The front suspensions of the vehicle also may be equipped with devices of the present invention in order to modify or correct the geometry of the front wheels independently of vehicle steering.

We claim:

1. A control system for the geometry of a wheel mounted on a hub support relative to a vehicle, comprising:
   a) two suspension components which are freely rotatable relative to the vehicle, the two suspension components extending generally in two planes and mounting the hub support to the vehicle;
   b) means to change the wheel turning radius of the suspension components, the means comprising two cams, each of the suspension components connected to one of the two cams, each cam rotatable about an axis extending generally perpendicular to the plane of the suspension component to which it is connected so as to vary the angle subtended by the suspension component and the vehicle; and,
   c) drive means linking the two cams so that rotation of one cam is translated into rotation of the other cam by the drive means.

2. System defined in claim 1, wherein the suspension components are mounted to the vehicle in two places.

3. System defined in claim 2, wherein the two suspension components each comprises two arms, the free end of each arm being mounted on the vehicle.

4. System defined in claim 1, wherein each cam comprises an eccentric or cam swivel movable about a shaft from a rest position in one or the opposite direction in order to vary the wheel turning radius in a desired direction.

5. System defined in claim 1, wherein the cams are linked to the vehicle steering.

6. Control system for the geometry of a wheel of a vehicle mounted on a hub support relative to a vehicle comprising:
   a) two suspension components, the two suspension components extending in generally parallel planes one end of said components connected to said hub support and another end connected to the vehicle;

b) means for varying at least two parameters of the geometry either separately or in combination, the means comprising at least two cams which are rotatable about axes extending generally perpendicular to the planes so as to vary the angle subtended between each suspension component and the vehicle, said cams pivotally mounting said suspension components to the vehicle; and c) means for driving the at least two cams, said drive means linking the two cams motion of one cam is translated into motion of the other.

7. System defined in claim 6, wherein each suspension component is mounted on the vehicle at two places.

8. System defined in claim 7, wherein each suspension component comprises two arms having free ends, the free end of each arm being mounted to the vehicle by at least one of said.

9. System defined in claim 8, wherein each free-end is mounted to the vehicle by means of a cam.

10. System defined in claim 9, wherein the drive means rotates the cams about a shaft from a rest position in one or the opposite direction, the cams being rotated either separately or in combination to vary one or several parameters of the wheel geometry.

11. System defined in claim 6, wherein the at least two cams are linked to the vehicle steering.

* * * * *